Aug. 31, 1965  J. S. RYDZ  3,203,546
CAN LEVEL DETECTION DEVICE
Filed April 12, 1962
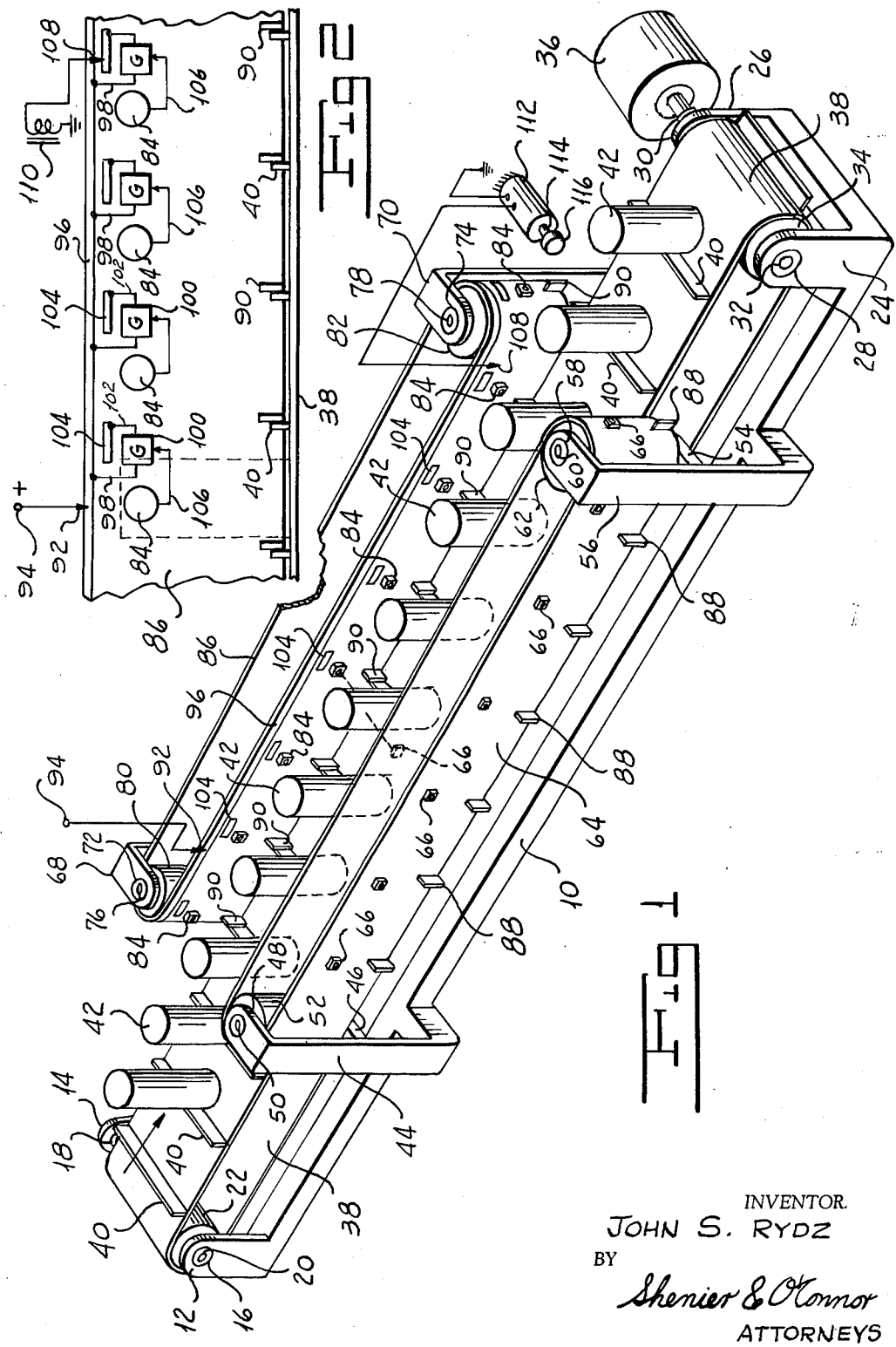
INVENTOR.
JOHN S. RYDZ
BY
Shenier & O'Connor
ATTORNEYS

United States Patent Office 3,203,546
Patented Aug. 31, 1965

3,203,546
CAN LEVEL DETECTION DEVICE
John S. Rydz, Scottsdale, Ariz., assignor to Nuclear Corporation of America, Phoenix, Ariz., a corporation of Delaware
Filed Apr. 12, 1962, Ser. No. 186,955
3 Claims. (Cl. 209—111.5)

My invention relates to a can level detection device and more particularly to an improved level detection device which operates at higher speeds than do level detecting devices of the prior art.

In packing plants and the like where a container such as a can or a carton is to be filled with material, which may be liquid or solid, to a predetermined level, it is desirable that precautions be taken to insure that only those containers which are filled to the proper level are shipped to customers. There are known in the prior art various systems for determining whether or not containers are filled to the proper level. It has been suggested, for example, that a stationary source of energy be placed at one side of a moving line of containers in a position to direct its energy toward a detector disposed on the other side of the moving line of containers. The source and detector are mounted at a height which is just below the level to which the container should be filled. When a container which is filled to the proper level is disposed between the source and detector, the material within the container absorbs an amount of radiation such that the detector does not receive sufficient energy to cause it to be activated. When a container which has not been filled to the proper level is located between the source and the detector, sufficient energy is received by the detector to activate the latter. Means may be provided for responding to the detector signal to indicate the presence of a can which has not been filled.

Obviously, it is desirable that the level detectors of the type described above shall operate at a relatively high speed so that speed of the packaging or canning operation or the like, is not restricted to that of which the level-detecting system is capable. The speed of operation of level-detecting systems of the prior art described above is limited by the time it takes the detector to sense the unfilled condition of a can disposed between the source and the detector; that is, the system must be such that a can is within the field of radiation for a sufficient time to produce a significant change in radiation level which can be detected by the detector. In a high speed canning operation reliable results might be ensured by causing cans to dwell in the area between the source and the detector for a period of time sufficient to permit a significant change in radiation level to take place. It will readily be apparent, however, that this operation slows down the entire canning operation. On the other hand, if no dwell is provided and the cans are moved at a relatively rapid rate through the space between the source and the detector, the operation of the system is made uncertain. This uncertainty may increase to a degree at which the level checking system is practically useless.

I have invented a level detecting system which overcomes the defects of level detecting systems of the prior art described above. My system is adapted to operate at very high speeds. My system is certain in operation in that the can being tested is kept in the space between a source and a detector for a period of time sufficient to permit a significant change in the radiation level to be produced.

One object of my invention is to provide an improved level detection system which overcomes the defects of level detecting systems of the prior art.

Another object of my invention is to provide a level detection system which is capable of operating at higher speeds than are possible with level detecting systems of the prior art.

A further object of my invention is to provide a level detection system which overcomes the uncertainty inherent in the operation of level detection systems of the prior art without detracting from the speed of operation of which my system is capable.

Yet another object of my invention is to provide a level detection system which virtually eliminates the uncertainty of operation of level detection systems of the prior art.

Other and further objects of my invention will appear from the following description:

In general, my invention contemplates the provision of respective energy source and energy detector conveyors mounted for movement adjacent a container conveyor in positions at which energy from the respective sources passes through successive containers toward corresponding detectors at a level just below the level to which the containers are to be filled. I drive the container conveyor and the source and detector conveyors in synchronization so that each of the moving cans or containers is between a source and a detector for a period of time sufficient to permit a significant change in the level of the radiation passing to the detector to take place. I provide means responsive to the operation of the detectors for rejecting a container which is not filled to the proper level.

In the accompanying drawings to which reference is made in the instant specification and which are to be read in conjunction therewith in which like reference characters are used to indicate like parts in the various views:

FIGURE 1 is a perspective view of one form of my level detection system.

FIGURE 2 is a fragmentary elevation with parts shown schematically of the form of my level detection system shown in FIGURE 1.

Referring now to the drawings, my can level detection device includes a support 10, one end of which carries spaced brackets 12 and 14 having bearings 16 and 18 which receive the ends of a shaft 20 supporting a conveyor roller 22. I provide the end of the support 10 remote from the roller 22 with spaced brackets 24 and 26 carrying bearings 28 and 30 which receive the shaft 32 of a conveyor drive roller 34. A motor 36 is adapted to be energized from a suitable source of energy (not shown) to drive shaft 32. Rollers 22 and 34 carry a conveyor belt 38 which is driven in the direction of the arrow shown in FIGURE 1 when motor 36 is energized. I provide the belt 38 with a plurality of spaced ribs 40 extending across the belt 38 and adapted to locate containers such as cans 42 on the belt. The cans 42 may contain any solid or liquid material, the level within the can 42 of which is to be sensed by my device.

A bracket 44 on the support 10 has offsets 46 and 48 carrying bearings which receive the shaft 50 of a source conveyor roller 52. At a location spaced along the length of support 10 from roller 52, I provide a bracket 56 having offsets 54 and 58 carrying bearings which support the shaft 60 of a second source conveyor roller 62. Rollers 52 and 62 carry a continuous belt 64 on which I mount a plurality of radiant energy sources 66 in spaced locations along the length of belt 64 at a height in FIGURE 1 just below the level to which the cans 42 should be filled.

Spaced brackets 68 and 70 mounted on support 10 on the other side from brackets 44 and 56 carry respective pairs of bearings 72 and 74 which support shafts 76 and 78 of radiation detector conveyor rollers 80 and 82. I mount a plurality of radiation detectors 84 in spaced relationship on a conveyor belt 86 carried by rollers 80 and 82 at a height in FIGURE 1 just below the level to which cans 42 should be filled.

As pointed out hereinabove, container conveyor 38 carries a plurality of ribs 40 for locating cans 42 along the length of the belt. It will readily be apparent that any other suitable locating means could be employed, such for example, as recesses in the surface of the belt. It is to be understood that adjacent sources 66 and adjacent detectors 84 are spaced by a distance equal to the distance between the vertical axes of a pair of successive cans 42 on belt 38. I provide my system with means for driving belts 64 and 86 in synchronism with belt 38 so that a can 42 located between belts 64 and 86 is disposed between a source 66 and a detector 84. Any appropriate means can be employed to accomplish this result.

In the particular embodiment of my invention shown in the drawings I provide belt 64 with a plurality of spaced teeth 88 having an intertooth spacing equal to the distance between successive ribs 40. Similarly I provide the belt 86 with teeth 90 having an intertooth spacing equal to the space between adjacent ribs 40. The location of belts 64 and 86 with respect to the belt 38 is such that as belt 38 moves the ends of a can locating rib 40 engage respective teeth 88 and 90 of belts 64 and 86 to drive these belts in synchronism with belt 38. As pointed out hereinabove, the arrangement is such that when all the belts 38, 64 and 86 are driven in synchronism, each moving can 42 disposed between belts 64 and 86 is in the space between a source 66 and a detector 84. The length of belts 64 and 86 is made such that a can 42 being tested is between a source 66 and a detector 84 for a sufficient length of time to permit a significant amount of radiation to pass from the source to the detector through an unfilled can to permit the detecting system to operate.

Any suitable means responsive to activation of a detector by energy from a source may be provided. In the particular embodiment of my system shown in the drawings, a stationary brush 92 carried by the support 10 applies potential from a source terminal 94 to a conductive strip 96 on the belt 86. Respective conductors 98 connect strip 96 to a plurality of normally nonconductive gating circuits 100 supported by belt 86. Conductors 102 connect the gating circuit output terminals to respective short conductive strips 104 on belt 86. Respective conductors 106 couple the output terminals of detectors 84 to the control input terminals of gating circuits 100. It will readily be apparent that as long as a detector 84 remains de-energized the gating circuit 100 will not conduct the potential on strip 96 to the corresponding strip 104. When, however, the detector is energized, its associated gating circuit 100 is rendered conductive so that the potential on strip 96 is coupled to the strip 104. I provide my system with a second stationary brush 108 positioned on support 10 at a location at which it engages the strips 104 in succession as the cans 42 emerge from between the belts 64 and 86. It will be appreciated that, if a detector 84 is actuated to trigger its associated gating circuit 100 to couple potential to the corresponding strip 104, when brush 108 contacts the strip it carries the potential to the external circuit to actuate any appropriate signal or rejection element. In the form of my system shown in the drawings, I connect brush 108 to the winding 110 of a solenoid 112 having an armature 114 provided with a head 116. When the armature winding 110 is energized by a potential on the strip 104 corresponding to an unfilled can 42 emerging from between belts 64 and 86 armature 114 is actuated to knock the can 42 off belt 38 to reject the unfilled can.

In operation of my can level detection device, cans 42 from a can lidding machine (not shown) or the like are received by the belt 38 and are conveyed in the direction of the arrow in FIGURE 1. Owing to the engagement between ribs 40 and teeth 88 and 90, belts 64 and 86 are driven at the same speed as belt 38. As a can enters into the space between the belts, a source 66 and a detector 84 respectively carried by belt 64 and by belt 86 move to positions at which they are on opposite sides of the can 42 entering the space between the belts. All of the can 42, the source 66 and the detector 84 remain aligned as the can travels through the space between the belts. Radiation from the source 66 is directed through the can toward the detector 84. If the can is filled to the proper level, the detector is not energized owing to the fact that the material within the can absorbs or disperses so much radiation that not enough reaches the detector to actuate it. If, however, the can is not filled to the desired level, radiation from the source impinges on the detector and the can, source and detector are aligned for a period of time sufficient to cause the radiation to actuate the detector to cause it to trigger the corresponding gate 100 to a conductive condition to apply potential to the associated strip 104. As the can emerges from the space between the belts, brush 108 engages the corresponding strip 104 and solenoid 112 is energized to reject the can.

It will be seen that I have accomplished the objects of my invention. I have provided a can level detection device which overcomes the defects of level detecting devices of the prior art. My can level detection device is capable of operating at much higher speeds than are possible with devices of the prior art. My level detection device is more certain in operation than are devices of the prior art.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what my claim is:

1. A level detection device for determining the presence of a container which is not filled to a desired level including in combination a container conveyor for moving a line of containers along a substantially straight path through a detection zone in spaced relationship, a plurality of energy sources, an endless conveyor for mounting said energy sources in spaced relationship at one side of said container line with a spacing equal to the spacing between adjacent containers for movement through said detection zone along a path generally parallel to said container path at a level just below said desired level, a plurality of energy detectors, an endless conveyor for mounting said detectors in spaced relationship on the other side of said container line with a spacing equal to the spacing between adjacent containers for movement through said detection zone along a path generally parallel to said container path at a level just below said desired level whereby a detector passing through said zone registers with a source passing through said zone, means for driving said container conveyor and said source conveyor and said detector conveyor in synchronism and means for sensing an energized detector as an indication of an unfilled container.

2. A level detection device for determining the presence of a container which is not filled to a desired level including in combination a container conveyor for moving a line of containers along a substantially straight path through a detection zone in spaced relationship, a plurality of energy sources, an endless conveyor for mounting said energy sources in spaced relationship at one side of said container line with a spacing equal to the spacing between adjacent containers for movement through said detection zone along a path generally parallel to said container path at a level just below said desired level, a plurality of energy detectors, an endless conveyor for mounting said detectors in spaced relationship on the other side of said container line with a spacing equal to the spacing between adjacent containers for movement through said detection zone along a path generally parallel to said container path at a level just below said desired level whereby a detector passing through said zone registers with a source passing through said zone, means for driving said container conveyor and said source conveyor and said detector conveyor in synchronism and means responsive to said sensing means for ejecting an unfilled container as it leaves said detection zone.

3. A level detection device for determining the presence of a container which is not filled to a desired level including in combination a container conveyor for moving a line of containers along a substantially straight path through a detection zone in spaced relationship, a plurality of energy sources, an endless conveyor for mounting said energy sources in spaced relationship at one side of said container line with a spacing equal to the spacing between adjacent containers for movement through said detection zone along a path generally parallel to said container path at a level just below said desired level, a plurality of energy detectors, an endless conveyor for mounting said detectors in spaced relationship on the other side of said container line with a spacing equal to the spacing between adjacent containers for movement through said detection zone along a path generally parallel to said container path at a level just below said desired level whereby a detector passing through said zone registers with a source passing through said zone, means for driving said container conveyor and interengageable means on said container conveyor and on said source and detector conveyors for moving said source and detector conveyors in synchronism with said container conveyor through said zone.

References Cited by the Examiner
UNITED STATES PATENTS

| | | | |
|---|---|---|---|
| 2,454,412 | 11/48 | Stoate | 209—111.5 X |
| 2,732,503 | 1/56 | Jacobs | 250—83.4 X |
| 2,868,374 | 1/59 | Borsook | 209—111.5 |

ROBERT B. REEVES, *Primary Examiner.*

HUGO O. SCHULZ, ERNEST A. FALLER, Jr.,
*Examiners.*